United States Patent Office 3,437,686
Patented Apr. 8, 1969

3,437,686
PERFLUORINATED THIODIGLYCOLIC ACID AND DERIVATIVES THEREOF
Robert C. Slagel, Burnsville, Minn., assignor to Ashland Oil & Refining Company, Ashland, Ky., a corporation of Kentucky
No Drawing. Filed Mar. 7, 1966, Ser. No. 532,065
Int. Cl. C07c 149/22, 69/34
U.S. Cl. 260—481        5 Claims

ABSTRACT OF THE DISCLOSURE

A new class of compounds of the formula:

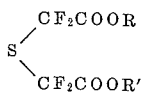

wherein R is either hydrogen, a cation such as sodium, potassium, ammonium, lithium, ½ calcium or ½ magnesium, or an aryl, aralkyl, aliphatic or cycloaliphatic radical; and R' is either R or the radical:

wherein $n$ is 0 to about 50 and X is the divalent radical of a polyhydric alcohol such as a glycol, a glycerol or a dihydric phenol.

This class of compounds includes perfluorinated thiodiglycolic acid, its salts, and its esters.

---

This invention relates to new chemical compounds and processes for their preparation. In another aspect, it relates to a new perfluorinated thiodiglycolic acid, its salts and its esters. In a further aspect, it relates to the processes for the preparation of perfluorinated thiodiglycolic acid and its derivatives.

It is an object of the present invention to provide as a new class of chemical compounds, perfluorothiodiglycolic acid, its salts, and its esters. Another object is to provide mono- and diesters of perfluorothiodiglycolic acid with monohydric alcohols or polyhydric alcohols. It is a further object of this invention to provide processes by which the compounds of this invention are prepared. Other objects will be apparent from the ensuing description.

In accordance with the present invention, the foregoing objects have been accomplished by the provision of a new class of compounds of the formula:

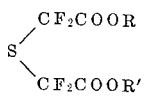                I wherein R is either hydrogen, a cation such as sodium, potassium, ammonium, lithium, ½ calcium or ½ magnesium, or an aryl, aralkyl, aliphatic or cycloaliphatic radical; and R' is either R or the radical:

wherein $n$ is 0 to about 50 and X is the divalent radical of a polyhydric alcohol such as a glycol, a glycerol or a dihydric phenol.

It will be recognized from Formula I that the present invention contemplates the free perfluorothiodiglycolic acid (Formula I, R and R' equal H); salts of perfluorothiodiglycolic acid (Formula I, R and R' equal cations) such as the sodium, potassium, ammonium, lithium, calcium and magnesium salts of perfluorothiodiglycolic acid; and esters of the acid of Formula I with monohydric and polyhydric alcohols.

Among the suitable monohydric alcohols which can be used to form monomeric esters of Formula I, there may be named alkanols of 1–18 carbon atoms, such as methanol, ethanol, iso-propyl alcohol, n-butyl alcohol, 2-ethyl hexanol, cyclohexonal, 2-bromo ethanol, dodecyl alcohol and cetyl alcohol; alkenols of 1–18 carbon atoms, such as allyl alcohol and oleyl alcohol; aryl alcohols, especially monocyclic aryl alcohols, such as phenol, cresol (either mixed or separated o-, m- and p-isomers), p-bromo phenol and xylenol (either mixed or separated isomers); and aralkyl alcohols, especially monocyclic aryl(lower alkyl) alcohols, such as benzyl alcohol or betaphenol ethanol.

Alternatively, esters of the acid of Formula I with polyhydric alcohols are also contemplated as a part of the present invention. Among such polyhydric alcohols are alkylene glycols, such as ethylene glycol, 1,2-propylene glycol, butylene glycol, diethylene glycol, polyethylene glycol, polypropylene glycol, polytetramethylene glycol, and 1,4-dimethylol cyclohexane; glycerols, such as glycerol and 2,2-dimethylol propanol; and polyhydric phenols, such as hydroquinone, resorcinol and 4,4'-sulfonyldiphenol. Reaction with polyhydric alcohols results in the formation of polymeric materials, e.g., poly(ethylene perfluorothiodiglycolate), poly(propylene perfluorothioglycolate), poly(butylene perfluorothiodiglycolate, poly(phenylene perfluorothiodiglycolate) and the like. The molecular weight of the polymers can vary from about 500 to about 10,000, depending upon reaction times, reaction conditions, and the incorporation into the polymeric mix of suitable chain-stopping materials. The determination of the particular reaction conditions to achieve a polymer of the desired molecular weight follows conventional lines and is within the skill of the art. It will be recognized that by the suitable adjustment of molar proportions, either hydrox-terminated or carboxy-terminated polymers can be obtained. Likewise, the polymeric materials can be obtained by transesterification of monomeric esters of perfluorothiodiglycolic acid, rather than by esterification of the acid per se.

The monomeric compounds of Formula I, in addition to their utility as starting materials for the preparation of condensation polymers, are also useful as antioxidants and stabilizers for various materials which are prone to oxidative degradation, e.g., polyolefins such as polypropylene.

The polymeric materials produced by the esterification of the monomers of Formula I can be used for their film-forming properties in the preparation of coating compositions. Those polymeric materials having molecular weights of a high order are most useful in this capacity.

The polymeric condensation products which are hydroxy-terminated (prepared by the reaction of perfluorothiodiglycolic acid with an excess of polyhydric alcohol), especially those of a molecular weight in the range of about 500 to about 2,000, are additionally useful in the preparation of polyurethanes. For example, by the reaction of such a hydroxy-terminated polymeric material with a diisocyanate, e.g., toluene diisocyanate, there can be obtained an isocyanate-terminated prepolymer which can be cured with conventional diamine and glycol curing agents of the type normally used in the preparation of polyurethanes.

The acid and salts designated by Formula I can be prepared by the following series of reactions:

(1) Tetrachlorothiophene is fluorinated by treatment with an inorganic fluorinating agent to give 2,2,5,5-tetrafluoro-3,4-dichlorothiolene. This reaction has been reported in the literature using silver difluoride as the source of fluorine (Ulrich et al., Journal of Organic Chemistry, 27, 2593 (1962)). Other sources of active fluorine can be used instead of silver difluoride. Examples of these are antimony pentafluoride, cobalt trifluoride, ceric fluoride, manganese fluoride, and the like. This reaction is shown in the following equation:

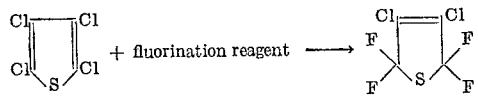

Equation I (2) According to one aspect of this invention, 2,2,5,5-tetrafluoro-3,4-dichlorothiolene is subjected to oxidation conditions, resulting in the rupture of the thiolene ring. Using as an example of the oxidation agent potassium permanganate, this reaction is shown in the following equation:

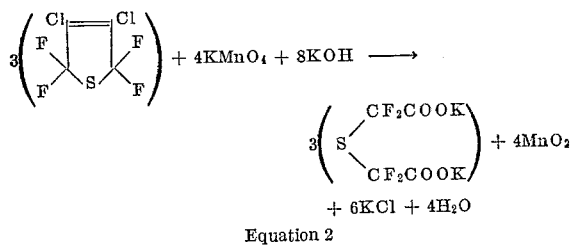

Equation 2

Other oxidation reagents such as chromic oxide, nitric acid, nitrogen tetroxide or nitric acid and oxygen may be used for this reaction. The ratio of oxidation agent to thiolene can be above the theoretical requirements. Two to three times the amount shown in the equation can be used, but, in general, for economic reasons, it is preferred to use a theoretical amount of oxidizing agent. The oxidation reaction can be conducted at a temperature in the range of about 50°–150° C. Within this broad temperature range, however, it will be found that best results are obtained by conducting the reaction at a temperature of about 85°–90° C. Oxidation can normally be accomplished within about 1–48 hours, but best yields are obtained within 6–19 hours. By adjustment of proportions and temperatures, however, good yields can be obtained after about one hour. In preferred embodiments, conditions should be adjusted so that the reaction is completed in about 4–8 hours. Other strong bases, such as sodium hydroxide, may be used instead of potassium hydroxide in the foregoing reaction.

Acidification of the salt produced by the reaction of Equation 2 with a strong acid such as mineral acids, e.g., sulfuric acid, hydrochloric acid, or the like, results in the formation of perfluorothiodiglycolic acid (Formula I, R and R′=H) which can be recovered by extraction with ether and evaporation of the solvent.

Monomeric esters of perfluorothiodiglycolic acid can be prepared, in another aspect of this invention, by treatment of acid prepared in (2) with a monohydric alcohol. The esterification reaction follows conventional esterification procedures. The reaction is conducted at elevated temperatures, preferably under reflux conditions in a solvent such as benzene, toluene, or acetonitrile. While the equation shows the use of 2 mols of alcohol for each mol of acid, one can use either less or more of the alcohol. If less is used, for example, equimolar amounts of alcohol and acid, then the esterification product will consist primarily of mono-ester. If the alcohol is present in a ratio of at least 2:1, then the diester is obtained. Any excess of alcohol may be used consistent with economical considerations. The reaction time for esterification is generally in the area of about fifteen minutes to about twelve hours. Good yields can be obtained if reaction conditions are maintained for about one hour. The methyl and ethyl esters are liquid products. They may be recovered from the reaction product by conventional extraction (e.g., with aqueous bicarbonate) or distillation procedures.

Among the alcohols which can be suitably used in this reaction, there can be named alkanols, especially those of 1–18 carbon atoms such as methanol, ethanol, propanol, butanol, lauryl alcohol, stearyl alcohol, and the like; alkenols of 1–18 carbons such as allyl alcohol, or oleyl alcohol; monohydric aryl compounds such as phenol, cresol, and the like; and ar(lower alkyl) monohydric alcohols, such as benzyl alcohol and beta-phenylethanol.

The following examples are presented to further illustrate the present invention, but it should be understood that the particular reactants and amounts thereof used in these examples, as well as reaction conditions and other details, should not be construed to unduly limit this invention.

Example 1.—Synthesis of 2,2,5,5-tetrafluoro-3,4-dichlorothiolene

Tetrachlorothiophene (40 g.), kept liquid by a steam jet, was dropped slowly into a flask containing silver difluoride (120 g.) which had previously been cooled in an ice-water bath. The flask was shaken periodically and the gas evolved was trapped in a Dry-Ice acetone trap. The trap material (about 2 ml.) was poured back into the reaction mixture, which in turn was then distilled to provide about 29 g. of distillate. Redistillation on a spinning band column at a reflux ratio of 10:1 provided 14 g. of 2,2,5,5-tetrafluoro-3,4-dichlorothiolene with better than 90% purity as shown by vapor phase chromatography.

Example 2.—Synthesis of perfluorothiodiglycolic acid 2,2,5,5-tetrafluoro-3,4-dichlorothiolene (9.08 g.; 0.04 mol), prepared according to Example 1, 16.9 g. (0.107 mol) of potassium permanganate, 3.0 g. (0.054 mol) of potassium hydroxide and 80–90 ml. of water were placed in a 200 ml. flask equipped with a thermometer, condenser and magnetic stirrer. The mixture was allowed to stir at 84–89° C. for six hours before steam distilling to remove any of the unreacted acid. The pot material was cooled in an ice bath and acidified with a solution consisting of 9 ml. of concentrated sulfuric acid in 14 ml. of water. The resulting mixture was then treated with gaseous sulfur dioxide with cooling until all the $MnO_2$ had been reduced, and then it was subjected to continuous extraction with ether for 24 hours. The ether extracts were evaporated to give 3.6 g. of perfluorothiodiglycolic acid as a semi-solid material.

Example 3.—Synthesis of the dimethyl ester of perfluorothiodiglycolic acid

The perfluorothiodiglycolic acid of Example 2 (0.01 mol) was esterified by boiling with a mixture of benzene and a large excess of methanol. Filtration to remove the remaining insoluble solid and evaporation of the solvent from the filtrate gave 2.5 g. of a colorless oil shown by the infrared spectrum and elemental analysis to be the dimethyl ester of perfluorothiodiglycolic acid.

*Analysis.*—Calcd. for $C_6H_6F_4O_4S$: C, 28.80; H, 2.42; F, 30.38; S, 12.79. Found: C, 28.65; H, 2.46; F, 29.78; S, 14.13.

The mono-methyl ester of perfluorothiodiglycolic acid can be obtained by the foregoing procedure if the concentration of methanol in the esterification mixture is reduced to about 0.01 mol, while using the same concentration of perfluorothiodiglycolic acid.

Example 4.—Synthesis of the dilauryl ester of perfluorothiodiglycolic acid

The procedure of Example 3 is followed, except that the perfluorothiodiglycolic acid is esterified with a large excess of lauryl alcohol instead of methanol. After several hours, the product is recovered from the reaction mixture.

Example 5.—Preparation of the disodium salt of perfluorothiodiglycolic acid

Perfluorothiodiglycolic acid (2.20 g., 0.01 mol) was added to a 10% aqueous sodium hydroxide solution containing 0.8 g. (0.02 mol) of sodium hydroxide. The resulting solution was then evaporated in a vacuum oven at 110° C. to give about 3 gm. of a white solid shown by its infrared spectrum to be sodium perfluorothiodiglycolate.

Example 6.—Preparation of polyethyleneperfluorothiodiglycolate

A mixture of 2.22 g. (0.010 mol) of perfluorothiodiglycolic acid, 0.7 g. (0.011 mol) of ethylene glycol and 50 ml. of benzene were refluxed in a flask fitted with a condenser and Dean Stark tube until no more water was azeotroped. Evaporation of the benzene and excess ethylene glycol resulted in 2.8 g. of a nearly colorless polymer with terminal hydroxyl groups as shown by its infrared spectrum.

Various modifications and alterations of this invention will become apparent to those skilled in the art without departing from the scope and spirit of this invention.

I claim:
1. A compound of the formula:

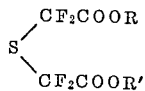

wherein R and R' are independently either hydrogen, a cation selected from the group consisting lithium, sodium, potassium and ammonium, alkyl or alkenyl.
2. Perfluorothio diglycolic acid.
3. Sodium perfluorothiodiglycolate.
4. Dimethyl ester of perfluorothiodiglycolic acid.
5. Dilauryl ester of perfluorothiodiglycolic acid.

References Cited

UNITED STATES PATENTS 2,438,484  3/1948  Henne _____ 260—537
2,438,485  3/1948  Henne _____ 260—537

OTHER REFERENCES

Morrison et al.: "Organic Chemistry," Allyn & Bacon, Inc., Boston (1959), pp. 438, 482.

LORRAINE A. WEINBERGER, *Primary Examiner.*

M. G. BERGER, *Assistant Examiner.*

U.S. Cl. X.R.

260—537, 479, 75, 332.5